United States Patent [19]

Szigethy et al.

[11] Patent Number: 5,470,098
[45] Date of Patent: Nov. 28, 1995

[54] SLIDING CUSHION RETAINER WITH SELF-LOCKING DEVICE

[75] Inventors: Attila Szigethy, Rocky River, Ohio; Brian C. Jenkins, Roy, Utah; Marc D. Folsom, Mitaka, Japan

[73] Assignee: Morton International, Inc., Chicago, Ill.

[21] Appl. No.: 225,846

[22] Filed: Apr. 20, 1994

Related U.S. Application Data

[63] Continuation-in-part of Ser. No. 78,377, Jun. 17, 1993, abandoned.

[51] Int. Cl.$^6$ .................................................. B60R 21/16
[52] U.S. Cl. ............................................ 280/728.2; 403/80
[58] Field of Search ............................ 280/728 A, 728 R, 280/731, 732; 403/3, 4, 80

[56] References Cited

U.S. PATENT DOCUMENTS

| | | | |
|---|---|---|---|
| 4,111,457 | 9/1978 | Kob et al. ............................ | 280/728 |
| 5,074,585 | 12/1991 | Satoh ................................... | 280/743 |
| 5,255,937 | 10/1993 | EmamBakhsh et al. ............. | 280/728 |
| 5,261,692 | 11/1993 | Kneip et al. ........................ | 280/728 A |

FOREIGN PATENT DOCUMENTS 4308197  9/1993  Germany ........................... 280/728 A

*Primary Examiner*—Eric D. Culbreth
*Attorney, Agent, or Firm*—Mark F. LaMarre; Charles N. Lovell; Gerald K. White

[57] ABSTRACT

A retainer ring having expandable sides for attaching a passenger side air bag to a air bag module canister. The retainer ring accommodates slight variations in the canister thus permitting the air bag cushion to be securely fastened to the canister without the formation of gaps between the air bag cushion and the canister. This reduces gas leakage from the canister during deployment of the air bag cushion. A self-locking mechanism is also provided to permit assembly of the retainer ring without the need for fasteners or special tools.

3 Claims, 5 Drawing Sheets

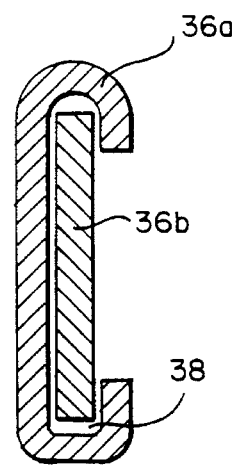
FIG. 3
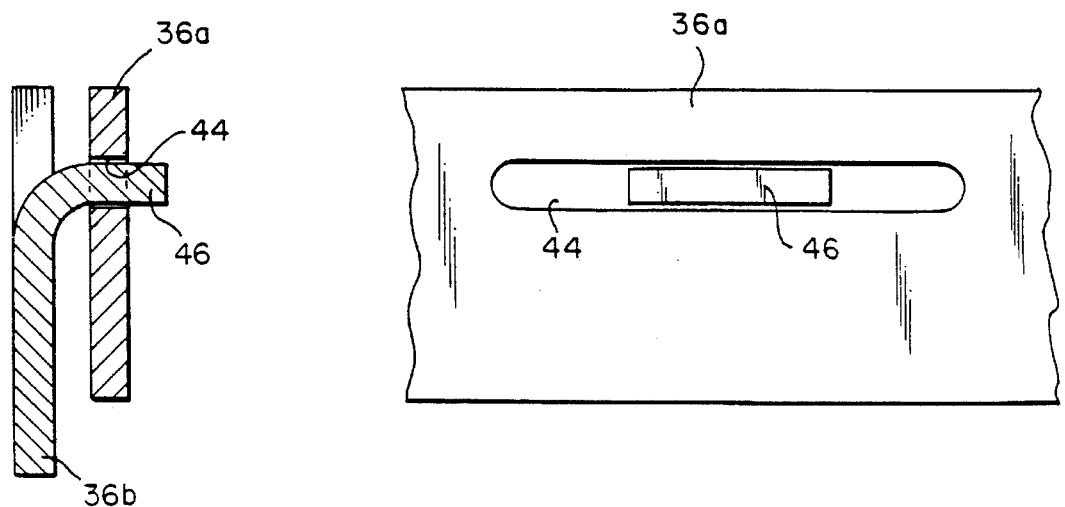
FIG. 4
FIG. 4a

SLIDING CUSHION RETAINER WITH SELF-LOCKING DEVICE

BACKGROUND OF THE INVENTION

This application is a continuation-in-part of U.S. application Ser. No. 08/078,377, filed Jun. 17, 1993, now abandoned.

FIELD OF THE INVENTION

This invention relates generally to inflatable-type modular occupant restraint systems for passenger vehicles or, as it is more commonly known, an air bag restraint system. More particularly, this invention relates to an improved device for attaching the air bag cushion to an air bag module canister.

DESCRIPTION OF RELATED ART

An air bag restraint system module typically includes an air bag cushion, a canister which has an open side and encloses an inflator and at least part of the air bag, and a cover which conceals the module from view. When an air bag module is designed for the driver side of a vehicle the module is located in the steering wheel behind a cosmetic cover which is an integral part of the steering wheel design. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard.

When the vehicle is involved in a collision, a crash signal initiates operation of the inflator to cause the air bag to deploy. The inflator produces an inert gas (e.g., nitrogen) which is directed under pressure into the air bag to force the air bag out of the container incorporated into the module and into the passenger compartment of the vehicle. As the air bag is forced out of the container, the pressure exerted on the cosmetic cover causes selected portions of the cosmetic cover to separate, in a predetermined manner, along tear seams or breakaway seams to enable the air bag to be directed into the passenger compartment. As the air bag is directed into the passenger compartment, it is inflated by the continued flow of gas produced by the inflator. To provide for the proper inflation of the air bag cushion the cushion must be securely fastened to the canister.

In order to attach the air bag cushion to the canister opening, a rectangular metal retainer ring of fixed circumference may be sewn into the air bag cushion adjacent to a gas inlet opening designed to receive a gas from an inflator. One side of the retainer ring is affixed to one canister wall with fasteners, such as rivets or the like, passed through fastener holes in the side of the ring. The antithetical side of the ring is attached to the opposite canister wall in a like manner. Typically, the center section of one side of the air bag retainer ring is fastened to the canister first, then the ends of the ring are attached to the canister. If the ring is not properly sized for the canister opening its use will result in incomplete attachment of the air bag cushion to the canister, which can possibly result in the improper deployment of the air bag cushion.

Normally, one side of the ring will attach securely along one side of the retainer ring. When the opposite side of the retainer ring is affixed to the opposite side of the canister opening a gap may form between the ring and the canister wall along the entire length of the second ring section. This gap may permit gas generated by the gas generator to escape from the module without entering the air bag cushion. Also, if a rivet is used to affix the retainer ring to the canister, the rivet may deform between the ring and the canister wall, which may provide insufficient attachment of the cushion to the canister. Alternatively, the retainer ring may be attached securely at the center section of ring; but the corners of the retainer ring may be deformed or rounded so that they do not conform properly to the corresponding corners of the canister. Again, this may provide gaps for gas to escape during deployment of air bag cushion in the event of a collision. Further, the fasteners used to attach the corners of the ring to the canister may not bridge the distance from the ring to the canister wall, thereby insufficiently securing the cushion to the canister.

When the retainer ring fails to attach the bag to the canister in a satisfactory manner, the module must be partially disassembled to provide for the correct attachment of the air bag cushion. Any useful parts are retained for later use. The cost associated with disassembly and reassembly of the module to correct the problems caused by incorrectly sized rings can be significant—due to the cost labor and loss of damaged parts which must be discarded. It would be preferable to use a retainer ring which could be attached securely to the canister while providing the flexibility to accommodate slight variations in the size of the canister. Further, it is preferred that the assembly of the retainer ring can be accomplished without the use of fasteners, such as rivets or the like.

SUMMARY OF THE INVENTION

An object of this invention is to provide a device which provides for secure attachment of an air bag cushion to a canister while providing a minimal gap between the air bag cushion and the canister wall.

Another object of this invention is to provide a device for attaching an air bag cushion to an air bag module canister wherein the attachment device can accommodate variations in the size of the canister dimensions.

Another object of this invention is to provide increased reinforcement of the canister opening in order to reduce deformation or bell-mouthing of the canister due to deployment of the air bag cushion.

Another object of this invention is to provide a device for attaching an air bag cushion to an air bag module, which device can be easily assembled and which locks without fasteners to prevent the separation of components of the device.

Another object of this invention is to provide a device for attaching an air bag cushion to an air bag module, which device can be manufactured with a minimal amount of tooling and the design of the device is such as to not require that components be made to strict tolerances.

These and other objectives of the invention, which will become apparent from the following description, have been achieved by a novel device for affixing an automotive air bag cushion to an air bag module canister comprising a retainer ring with one pair of sides joined together by a second pair of sides which are composed of two sections joined so as to permit the sections to move linearly relative to one another.

The air bag module canister for use with the retainer ring of this invention comprises outer walls and a base which define a cavity for a gas generator and at least part of the air bag cushion in a folded condition. Also, the wall further defines an opening to the cavity in the canister. The gas generator can be actuated to generate a gas under a pressure to inflate the air bag cushion. The air bag cushion comprises a first portion, which is disposed opposite an occupant of the vehicle, a second portion attached to the first portion, the second portion terminating in a third portion defining a gas inlet opening in the air bag cushion for receiving a gas from the gas generator. A band-like retainer ring member, comprising a pair of first sides and a pair of second sides attached thereto, is used to secure the air bag cushion to the canister walls. The first sides are attached to the air bag cushion adjacent to the gas inlet opening. The second sides comprise a first section, and a second section slidably engaged with the corresponding first section. The first sides of the band-like retainer ring are attached to the air bag cushion canister wall adjacent the canister opening thus fixedly attach the air bag cushion to the canister.

The second side of the retainer ring can be manufactured in a number of ways. For example, the second side first section can be shaped to form a channel and the second section is shaped in the form of a flat bar which slides within the channel of the first section. Alternatively, the second side first section can be manufactured with an elongated slot running substantially the length of the first section. The second section can be formed from a flat piece of material with an edge being bent to form a tab that is substantially perpendicular to the flat portion of the second section. The tab can then engage the elongated slot of the first section, thus permitting the second section to slide in relation to the first section.

Also, the retainer ring may comprise a first section having an elongated slot running substantially the length of the first section, a second section defining a plane and a fastener attached perpendicular to the second section of the second side and passing through and slidably engaging said slot of said first section.

In addition, the second side can be designed to be self-securing without the use of rivets or separate fasteners. For example, a resilient assembly can be used to form one section while the other section is formed into a channel. A resilient assembly such as two prongs which can be pushed together when inserted into a tubular section by force exerted on hooks attached to the end of the prongs. Hooks, or the like, would engage with the end of the tube when the prongs return to their original condition.

BRIEF DESCRIPTION OF THE DRAWINGS

A detailed description of the invention follows with reference being made to the accompanying figures of drawings which form part of the specification related thereto, in which like parts are designated by the same reference numbers, and of which:

FIG. 3 is a cross-sectional view taken along line 3—3 of FIG. 1 illustrating one embodiment of the slidably engaged side walls;

FIG. 4 is a cross-sectional view taken along line 3—3 of FIG. 1 illustrating a first alternate embodiment of this invention;

FIG. 4a is a front-plan view of the device shown in FIG. 4 illustrating the first alternate embodiment of this invention;

FIG. 8b is a top plan view of the device of FIG. 8a.

DETAILED DESCRIPTION OF THE INVENTION

Figure 1:
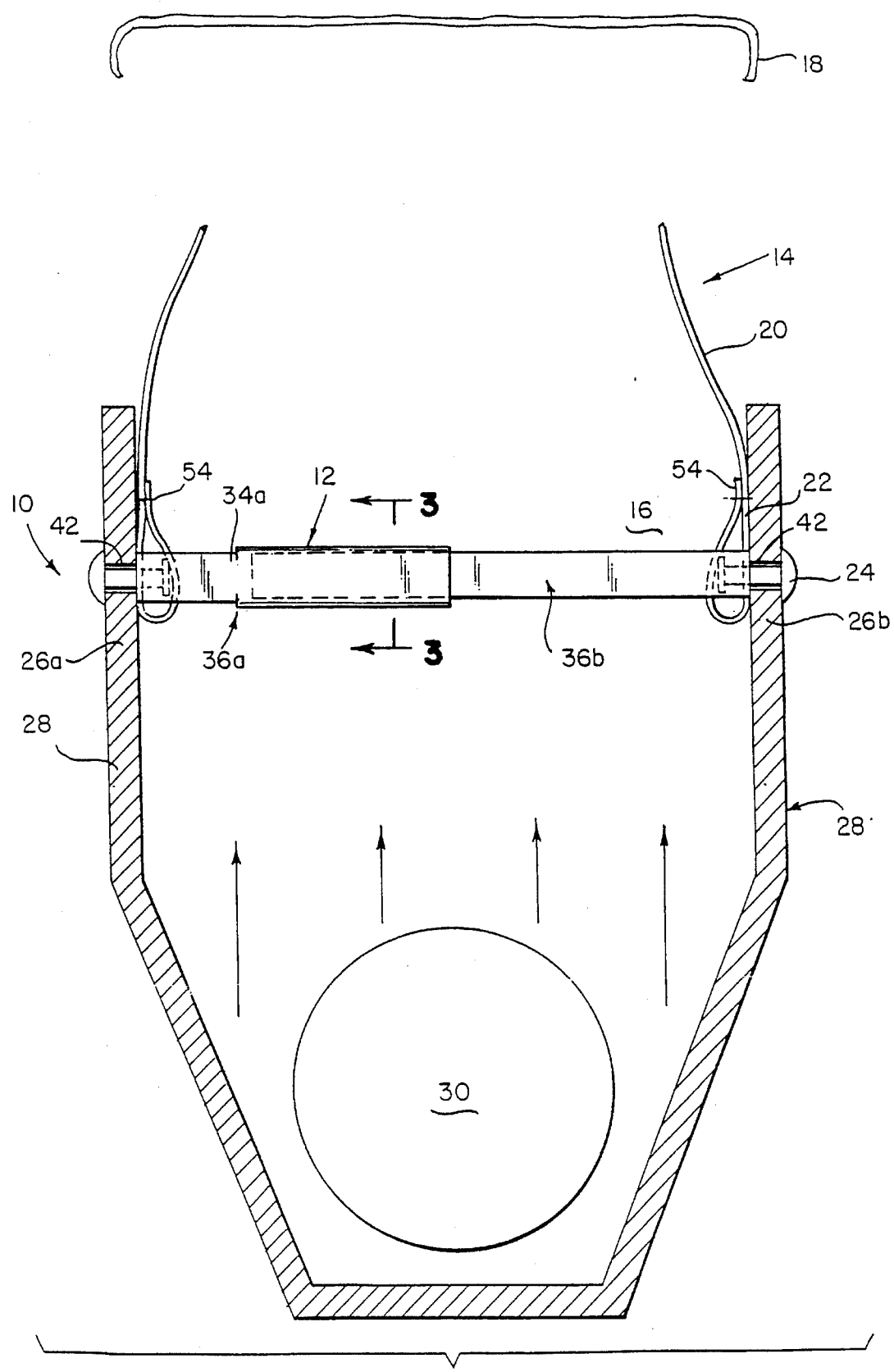
FIG. 1 is a cross-sectional view illustrating the attachment device of this invention in use to secure an air bag cushion to a module canister.

A passenger side air bag cushion module is shown generally at 10 in FIG. 1. The air bag cushion retainer ring 12 of this invention is attached to an air bag cushion 14 adjacent to the gas inlet opening 16 of the air bag cushion 14. The air bag cushion 14 is shown in fragmented form in order to simplify the drawings. The air bag cushion 14 comprises a first portion 18 which is disposed opposite an occupant of the vehicle during deployment. The air bag cushion second portion 20 is attached to the first portion 18, and terminates in a third portion 22 defining the gas inlet opening 16. Fasteners, such as rivets 24 or the like, secure the retainer ring 12 and the air bag cushion 14 to the front wall 26a and back wall 26b of the air bag module canister 28. The air bag cushion module 10 contains a gas generator 30 which upon activation generates a gas, i.e. nitrogen, which inflates and deploys the air bag cushion 14.

Figure 2:
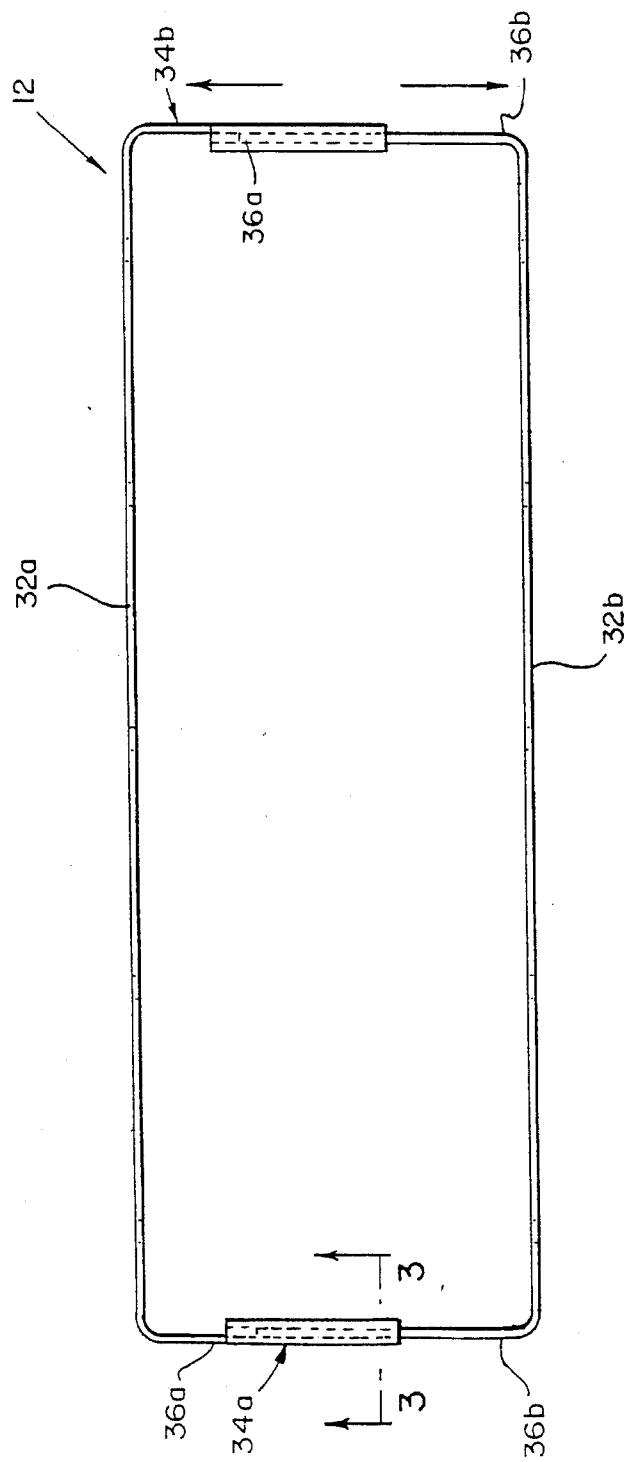
FIG. 2. is a top-plan view illustrating the air bag cushion retainer ring of this invention.
Figure 2A:
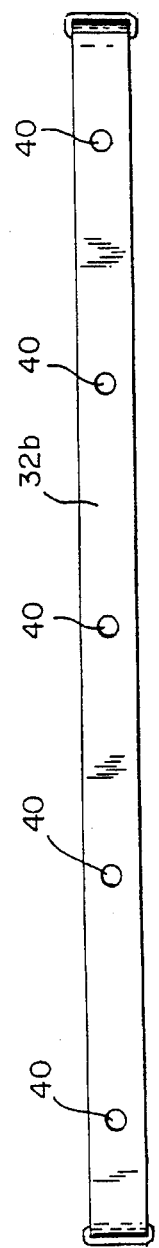
FIG. 2a is a side-plan view of the retainer ring of this invention illustrating the first side.

The retainer ring 12 of this invention, as shown in FIG. 2, comprises a pair of first sides 32a and 32b and a pair of second sides 34a and 34b. The first sides 32a and 32b may comprise a single section, as shown is FIG. 2a. The second sides 34a and 34b are made of a first section 36a and a second section 36b. The second side first section 36a is so designed to engage with the second side second section 36b to permit the second section 36b to move in sliding relation to the first section 36a thus permitting the length of the second sides 34a and 34b to vary in order to provide secure attachment of the air bag cushion gas inlet opening 16 to the front wall 26a and back wall 26b of the air bag module canister 28.

The cross-sectional view of line 3—3 of FIG. 2 which is shown in FIG. 3 shows one embodiment of this invention. In this embodiment the second side first section 36a is "C" shaped thereby forming a channel 38 into which the second side second section 36b can freely move. In this embodiment the two sections of the retainer ring 12, a first side 32a and the attached second side first sections 36a and the remaining first side 32b are engaged to form a retainer ring 12. The retainer ring 12 is then attached to the air bag cushion 14 adjacent to the gas inlet opening 16. One first side 32a is then secured to the front wall 26a of canister 28 by rivets 24 inserted through holes 40 in a retainer ring first side 32a and through holes 42 in the canister front wall 26a. The other first wall 32b is then brought into contact with the back wall 26b of canister 28, as second side second sections 34b slide within the second side first sections 36a, and secured by rivets 24.

Alternatively, the second sides 34a and 34b can be constructed as shown in FIG. 4. In this embodiment a slot 44 is cut into the second side first section 36a for at least part of the length of the second side first section 36b. A tab 46 is then formed from the second side second section 36b and is inserted into the slot 44 of the second side first section 36a. This permits the second side second sections 36b to slide relative to the second side first section 36a thus providing for the variable length of the second sides 34a and 34b.

Figure 5:
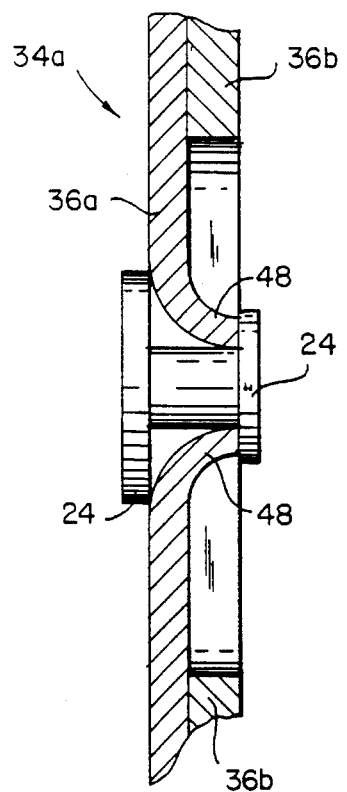
FIG. 5 is a cross-sectional view taken along line 3—3 of FIG. 1 illustrating a second alternate embodiment of this invention.
Figure 5A:
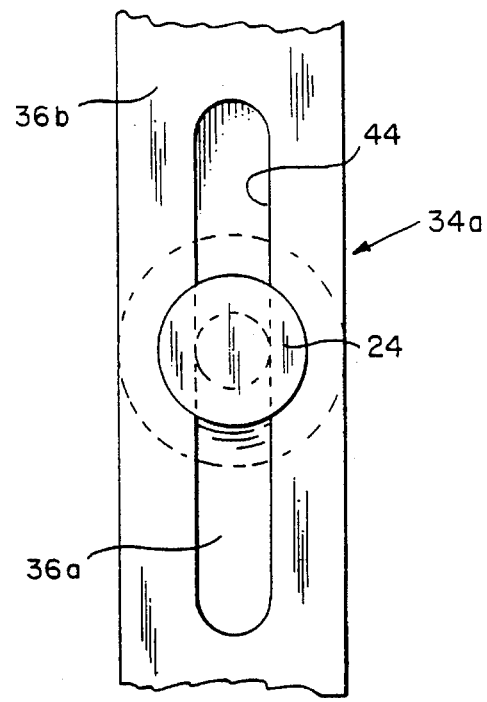
FIG. 5a is a front-plan view of the device shown in FIG. 5 illustrating the second alternate embodiment of this invention.

A second alternative embodiment of this invention is illustrated in FIG. 5. In this embodiment the rivet 24 and preferably two rivets are passed through the second side first section 36a deforming the material from which the first section 36a is made forming a dimple 48 which passes through slot 44 in second side second section 36b. The dimple 48 limits the movement of the second section 36b relative to the first section 36a about the dimple 48. Preferably two rivets 24 are used to limit the movement of the second section 36b relative to the first section 36a to linear movement. The use of a single rivet 24 permits one section to move rotationally relative to the first thus permitting the bending of the retainer ring second sides 34a and 34b. Such bending of the second sides 34a and 34b is undesirable from a manufacturing perspective as additional steps must be taken during the manufacturing process to insure proper installation of the air bag cushion retainer ring 12.

Figure 6:
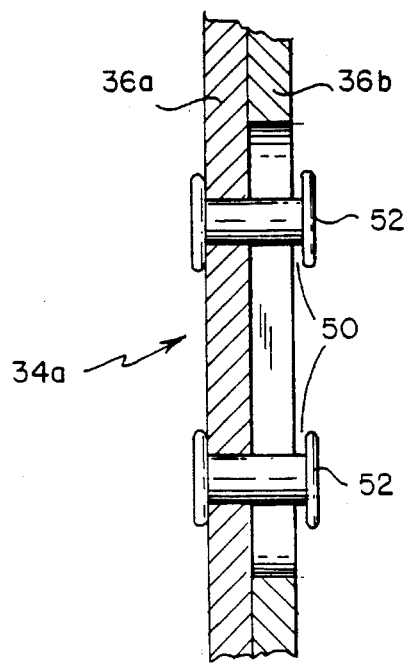
FIG. 6 is a cross-sectional view taken along line 3—3 of FIG. 1 illustrating a third alternate embodiment of this invention.

A third alternative embodiment of this invention is illustrated in FIG. 6. In this embodiment a rivet 24 is installed using a special nose tip on the rivet tool which forms a gap 50 between the rivet head 52 and the second side second section 36b. The gap permits the second side first section 36a to move relative to the second section 36b. As discussed hereinabove, the use of two rivets 24 are preferred as this limits movement of the two second side 34a and 34b sections to linear movement relative to one another.

Figure 8A:
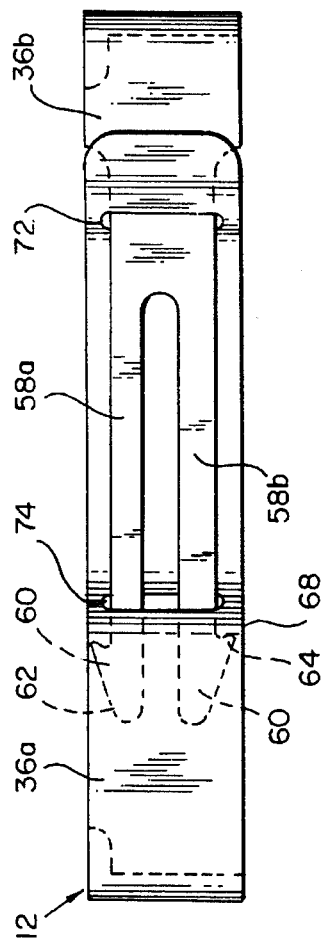
FIG. 8a is a side plan view illustrating an alternate self-locking mechanism for the sliding retainer of this invention.
Figure 8B:
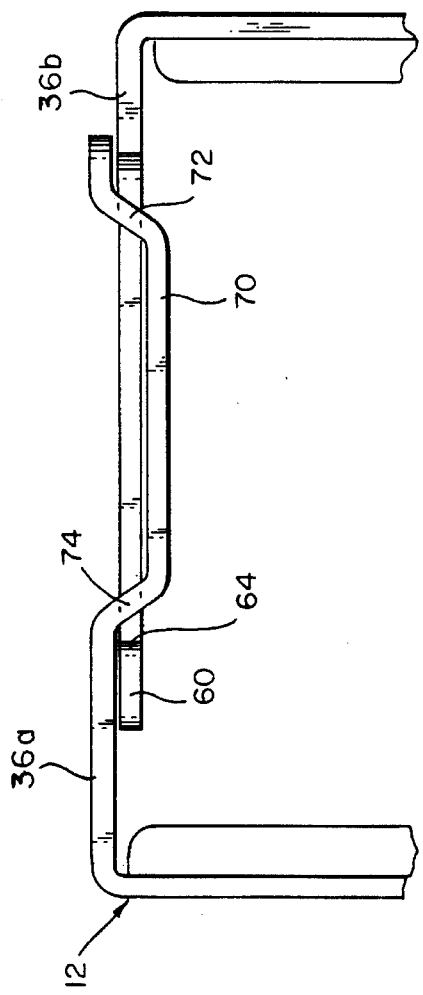
Figure 7:
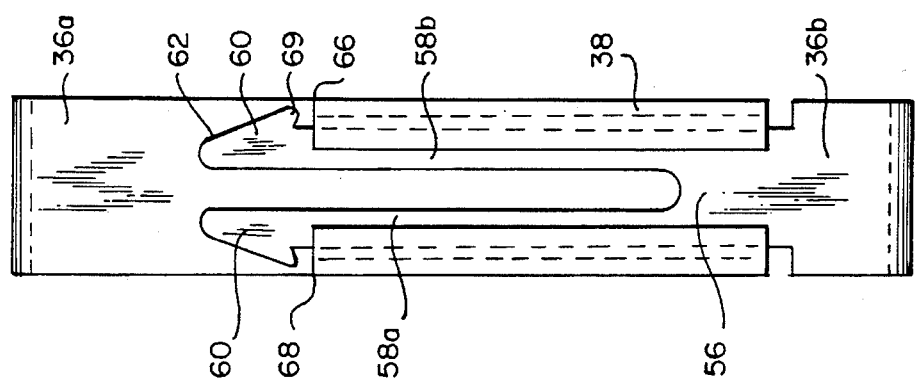
FIG. 7 is a side plan view illustrating a self-locking mechanism for the subject invention.

A fourth embodiment is provided for a self-locking retainer ring 12, as shown in FIGS. 7, 8a, and 8b. The second side first section 36a is formed into a tube or channel 38. The mating second section 36b is fabricated into a double prong fork 56 having prongs 58a and 58b. The prongs 58a and 58b are resilient such that when the prongs 58a and 58b are pushed toward one another they will return to their original position when force is removed. Triangular sections or hooks 60 are formed on the ends of each of the prongs 58a and 58b, as shown in FIG. 7. When the retainer ring 12 is assembled the angled portion 62 of hooks 60 pushes prongs 58a and 58b together as the hooks 60 and prongs 58a and 58b pass through channel 38. As the bases 64 of hooks 60 clear the channel end 66 the prongs 58a and 58b return to their normal (preinsertion) condition. The bases 64 of hooks 60 prevent the second side second section 34b from passing backward through the channel 38 without the use of a tool to force the prongs 58a and 58b together. The gap 68 formed between the bases 64 of hooks 68 and the channel end 66 provides the flexibility to accommodate variations in the size of the canister 28. This design provides a self-locking retainer ring 12 that can be assembled without special tools and without separate fasteners.

Alternately, the second side first section 36a can be bent, as shown in FIGS. 8a and 8b, to form off-set section 70 between a first aperture 72 and a second aperture 74 formed in second side first section 36a. The second side second section 36b having prongs 58a and 58b with attached hooks 60 discussed hereinabove is inserted through first aperture 72 and second aperture 74 so that the bases 64 of hooks 60 will prevent the second side second section 34b from passing backward through the first aperture 72 and the second aperture 74 without the use of a tool to force the prongs 58a and 58b together. This design has the added benefit in that manufacturing of the first section 36a in a progressive die will not produce a product which is extremely sensitive to material thickness. The channel 38 when formed in a progressive die may result in a channel thickness which is too narrow to accommodate the second section 36b.

The air bag cushion retainer ring 12 of this invention is fabricated from regular carbon steel; however higher grade steels, such as stainless steel, may be used. The parts are formed by progressive die stamping. The air bag cushion retainer ring 12 of this invention can be used with any passenger side air bag known in the art. The air bag cushion retainer ring 12 is typically attached to the air bag cushion 14 adjacent to the gas inlet opening 16. This is normally accomplished by folding over the bottom edge 54 of the air bag cushion 14 and stitching it to a section of the air bag cushion 14 near the gas inlet opening 16. The air bag cushion 14 with the attached retainer ring 12 is then installed in the air bag module canister 28 by the use of closed-end rivets 24 inserted in holes 40 in one of the retainer ring first sides 32a and holes 42 in the canister front wall 26a. The retainer ring 12 is expanded by bringing the remaining first side 32b into contact with the canister back wall 26b. This process of securing the retainer ring 12 to the canister 28 is repeated with other first side 32b being secured to the canister back wall 26b in like manner. The retainer ring 12 of this invention will function with any canister designed for use with a retainer ring. During deployment of the air bag cushion 14 the retainer ring 12 acts to reinforce the opening of the canister 28 to reduce deformation of the canister 28, which is commonly referred to as "bell-mouthing".

Thus, in accordance with the invention, a device has been provided which secures attachment of an air bag cushion to a canister while providing a minimal gap between the air bag cushion and the canister wall. There has also been provided a device for attaching an air bag cushion to an air bag module canister wherein the attachment device can accommodate variations in the size of the canister dimensions. Additionally, there has been provided a device for attaching an air bag cushion to an air bag cushion module in order to minimize the leakage of gas between the air bag cushion and the air bag cushion canister wall.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appended claims.

We claim:

1. An air bag subassembly for installation of an automotive air bag cushion, which has a gas inlet opening, to an air bag cushion canister comprising:

an air bag cushion having a first portion, which is disposed opposite an occupant of the vehicle, a second portion attached to said first portion, said second portion terminating in a third portion defining a gas inlet opening in said air bag cushion for receiving a gas from said gas generator;

an air bag cushion canister having an inside and an outside, including a wall having an inner and an outer surface, said wall defining a cavity for said gas generator with at least part of said air bag cushion in a folded condition, said wall further defining an opening to said cavity in said container; and an air bag cushion retainer ring comprising a pair of first sides and a pair of second sides attached to the first sides, said second sides comprising a first section having a first end, a second end, a first aperture and a second aperture in spaced relation from said first aperture wherein said first section between said first aperture and said second aperture is offset from a plane formed by the ends of the first section and a second section shaped in the form of resiliently deformable spring elements comprising spaced members with engagement means attached to the ends thereof, said second section slidably engaged with said second side first section such that when said resiliently deformable spring elements are inserted through said first aperture and said second aperture of said first section said resiliently deformable spring elements compress allowing said engagement means to pass through said apertures permitting said engagement means to engage with said second aperture and to form a spring loaded self locking device thereby preventing the second side second section from passing back through the second aperture; wherein said first sides of said retainer ring are attached to said air bag cushion adjacent said gas inlet opening while said retainer ring second sides are slidably engaged and said retainer ring first sides are attached to said air bag cushion canister wall adjacent said canister opening and fixedly attaching said air bag cushion third portion to said canister.

2. The device of claim 1 wherein said resiliently deformable spring elements comprise a plurality of prongs.

3. The device of claim 2 wherein said engagement means is a hook attached to the end of said resiliently deformable section.

* * * * *